Jan. 22, 1957 E. A. NYGARD 2,778,081
PIN STEM JOINT AND CATCH
Filed Nov. 24, 1953

INVENTOR.
ERIK A. NYGARD
BY
Barlow & Barlow
ATTORNEYS

2,778,081

PIN STEM JOINT AND CATCH

Erik A. Nygard, Woonsocket, R. I.; Hulda Nygard, administratrix of said Erik A. Nygard, deceased, assignor to Hulda Nygard Application November 24, 1953, Serial No. 394,081

6 Claims. (Cl. 24—156)

This invention relates to a pin stem joint and catch.

In the use of pin stem joints and catches, it is usual to provide a catch of the so-called safety catch type in which there is some moving part which requires manual manipulation for the locking of the pin stem in the catch and for movement to release the pin stem from the catch when it is desired to release the pin stem.

One of the objects of this invention is to provide a safety catch which will require no rotating or rocking parts.

Another object of the invention is to provide a safety catch which will have some resilience and elasticity, requiring a flexing of the parts when the pin stem enters, and the elasticity of the parts returning them to their initial position so that the pin stem will be locked in the catch by the returning of the parts under their elastic action, thus requiring no manual manipulation by finger nail or the like for the locking of the pin stem in position.

Another object of the invention is to so position the pin stem joint and pin stem that the pin stem will move into its locked position after being passed through a restricted portion of the catch.

Another object of the invention is to provide an extremely simple construction which may be easily, quickly, and inexpensively formed.

With these and other objects in view, the invention consists of certain novel features of construction as will be more fully described and particularly pointed out in the appended claims.

Figure 1:
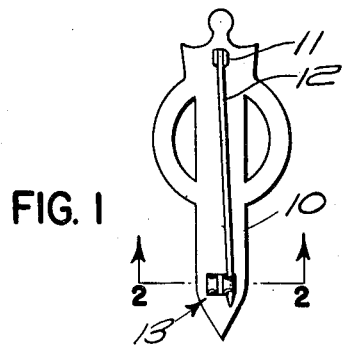
Figure 1 is a back view of an ornament having a pin stem joint and catch applied thereto in accordance with this invention.

Figures 9, 10, 11, and 12 are sectional views of a still different modified construction.

In proceeding with this invention, I bend up from sheet stock a catch comprising a hook and a guard adjacent the hook which will be spaced from the hook a distance so that there will be relative spreading of the parts as the pin stem enters between the guard and the hook. The pin stem joint and its pin are so positioned that the pin stem will normally swing in a path at one side of the hook and will require the pin stem to be flexed into a path to be moved between the hook and its guard so that when moved to a position beneath the edge of the hook and released, it will normally move into the hook. Further, the pin stem is so positioned that it normally would not swing to the hook without being flexed so that when it does extend beneath the hook, it will exert some pressure away from the base of the hook and on the under side of the hook. Thus, the pin stem is maintained under tension in two directions when locked in the hook.

Referring to the drawings, 10 designates an ornament which may be of varying shapes or forms and which may serve as a base in some instances for the mounting of a pin stem joint at 11 thereon which hingedly mounts a pin stem 12 to engage the pin stem catch 13 as shown in the various figures.

Figure 4:
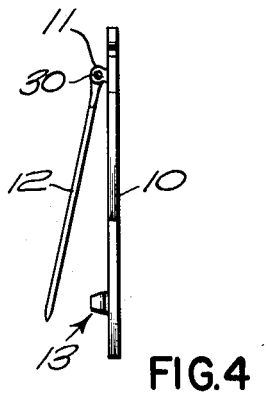
Figure 4 is an edge view of the ornament also showing the pin stem in its normal position untensioned and as spaced from the catch.
Figure 5:
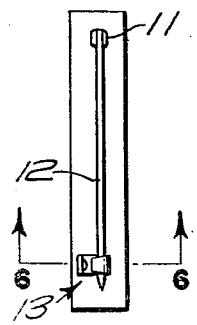
Figure 5 is a view similar to Figure 2 but showing a modified form of safety catch.
Figure 6:
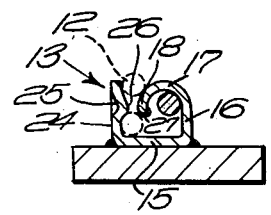
Figure 6 is a section on line 6—6 of Figure 5.
Figure 7:
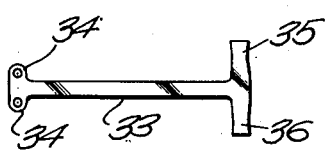
Figure 7 shows a blank from which the pin stem joint and safety catch of this invention may be formed all as one piece with a bar connecting the joint and catch.

In Figures 1-6 I have illustrated the catch as formed separately from the pin stem and its joint and soldered into position as at 14. In the forms where the base is separate in each instance the catch comprises a base 15 having an arm 16 extending generally perpendicular thereto and then extending laterally as at 17 of the arm and generally over the base 15 and then toward the base as at 18 to provide a hook formation. The portion of the arm extending laterally and toward the base is arched as shown in Figures 1 and 6, which may take the form of an arc of a circle although this may have other arcuate forms not truly from a single center. The portion 18 which extends toward the base will stop at a distance from the base to require flexing for the entrance of a pin stem which may be used with the catch. There is some resilience in the arm 16 so that it may be flexed at its junction with the base or along its length.

Figure 2:
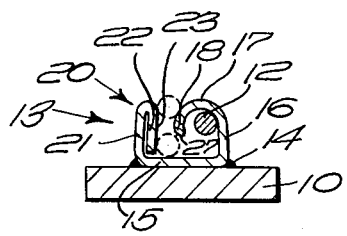
Figure 2 is a sectional view on line 2—2 of Figure 1.

A guard designated generally 20 extends perpendicular to the base 15 and is bent from the base and is of the same stock as the material of the base 15. This guard may have an arm 21 extending from the base a distance substantially the same as the distance from the base to the hook of the catch and is then doubled upon itself as at 22 as shown in Figure 2. This guard has its inner surface 23 which is toward the hook positioned a distance from the portion 18 less than the diameter of the pin stem 12 which is to be accommodated so that the guard and the hook must relatively spread outwardly apart to permit the pin stem as shown in dotted lines to enter. The folding of the portion 22 of the guard inwardly provides a curved surface as does also the arcuate portions 17 and 18 of the hook so as to provide a flaring mouth or camming surfaces which together with the cylindrical surface of the pin stem 12 provide a very advantageous wedging action as the pin stem is forced toward the base so as to spread the guard and the hook relatively and permit the pin stem to enter.

Figure 3:
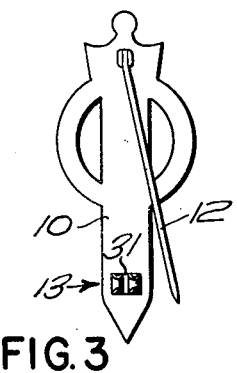
Figure 3 shows the pin stem detached from the catch and in the normal position which it assumes when not under tension.

In some cases the guard may take a different form from that shown in Figures 1 to 4, and in Figures 5 and 6 I have illustrated this guard 13 as comprising a single arm 24 extending generally perpendicular to the base 15. A portion of the arm is deflected to form a protuberance 25 on the surface toward the hook, providing a corresponding depression on the other side; this protuberance is located so that it has an arcuate surface 26 which provides an advantageous flare between its surface and the curved surface of the hook for receiving the cylindrical pin stem 12 and causing a wedging action as the pin stem is forced toward the base 15 to spread the guard and the hook so that the pin may enter. This protuberance 25 is at a location opposite the end 27 of the hook so that its overhanging portion assists in holding the pin stem in a location beneath it and the edge of the hook should the pin stem be moved to this position.

The pin stem 12 is mounted in its usual joint 11 by means of a pintle pin 30 and in positioning this joint and pin stem on the ornament 10, it will be so positioned that the pin stem will swing in an arc relative to the catch 13 so that it will be at one side of the catch and as shown in Figure 3 is on the side of the catch in which the hook instead of the guard is positioned. Thus, in order to move the pin stem into the opening between the catch and its guard, it is necessary to flex the pin stem from the position shown in Figure 3 to a position so that it will swing in a plane into the opening 31 (Figure 3) between the guard and the hook. Thus, when the pin stem arrives at a position in engagement with the base, it is under tension to move toward the arm 16 of the hook without any conscious effort of the one manipulating the pin. Further, the pin stem 12, as shown in Figure 4, is provided with a stop so that it would normally stand away from the catch 13 and ornament 10, thus requiring some flexing of the shank 12 to position it into the catch and beneath the hook. Thus, when the pin stem is freed beneath the hook, it tends to flex outwardly, and when in a position beneath the hook, will exert some flexing pressure on the under concave side of the hook.

The end 27 of the hook is positioned a distance from the base 15 slightly less than the diameter of the pin stem 12. Thus, for releasing the pin stem from the catch, it will be moved toward the base and then laterally to the positions shown in dotted lines in Figures 2 and 6 where it is against the base and also in engagement with the guard and the end of the hook, and it will be there retained due to the fact that it is slightly larger than the distance between the end 27 of the hook and the base. Thus, it will be a relatively easy matter for the person releasing the stem to place his finger nail beneath the pin stem and push it outwardly between the guard and the hook so that it may be released from the catch.

Figure 8:
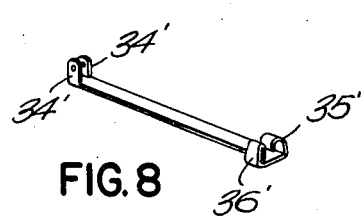
Figure 8 is a perspective view of the blank bent into finished position.
Figure 9:
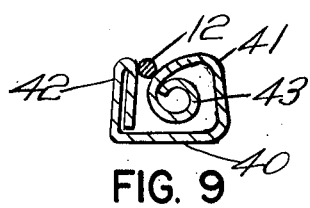

In some cases the joint and catch may all be formed in one piece in which there is a bar 33 forming the base with the ears 34 of the joint formed integral with the bar 33 and bent up at right angles thereto as shown at 34' in Figure 8, while the sheet stock for the catch has the portion to provide the hook at 35 and the portion to provide the guard at 36, which are bent up to form the hook 35' and the guard 36' as shown in Figure 8. This bar 33 may then have the pin stem mounted in its joint and the entire assembly positioned and secured on some ornament as may be desired.

In Figures 9, 10, 11, and 12 the base 40 is shown as provided with a hook 41 and guard 42, the guard being the same as described above in Figures 1–4, inclusive. The hook, however, is of greater extent and is rolled to provide a closed loop 43, the whole hook being sufficiently resilient so that when a pin stem 12, which may not be offset as shown in Figures 3 and 4, is inserted, it may pass from the position shown in Figure 9 to the position shown in Figure 10 by crowding to the right the closed loop portion of the hook. It may then move to the position shown in Figure 11 by crowding upwardly the loop, while still further movement again upwardly of the pin stem 12 to lock it in the corner 45 will crowd the closed loop 43 to the left. As each movement occurs a "click" will be heard as the pin snaps by the loop.

Figure 10:
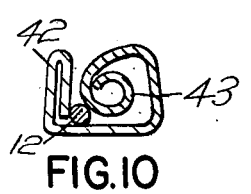
Figure 11:
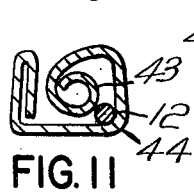
Figure 12:
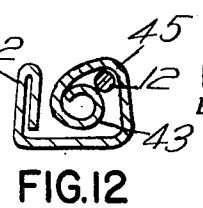

This closed loop by reason of this resilience thus blocks the pin stem from being extracted from the catch in the several different positions in Figures 10, 11, and 12 all of which serve to provide a holding position. This type of catch is particularly advantageous where the pin stem will not be bent or offset but is rather loosely mounted on a large badge such as a policeman's or sheriff's badge or the like.

I claim:

1. A catch for a pin stem comprising a base with an arm extending generally perpendicular thereto then laterally over the base and then toward the base to provide a retaining hook for the pin stem to be received in the hook, the portion of said hook adjacent the base being spaced therefrom a distance less than the diameter of said pin stem and a guard extending generally perpendicular to the base adjacent said hook with its surface facing the hook spaced from the hook a distance less than the diameter of the pin stem, said guard and hook being relatively elastically resilient to spread apart as pressure is exerted on them through the pin stem and said hook to be moved from said base to permit the pin stem to enter and be positioned within said hook.

2. A catch as in claim 1 wherein said guard has an arched protuberance extending from its surface toward said hook.

3. A catch as in claim 1 wherein said guard has an arched protuberance extending from its surface toward said hook and spaced from the base and opposite the portion of the hook extending toward the base.

4. A pin stem catch and joint comprising a base, a catch having an arm extending generally perpendicular thereto then laterally over the base and then toward the base to provide a retaining hook for the pin stem and a guard extending generally perpendicular to the base adjacent said hook with its surface facing the hook spaced from the hook a distance less than the diameter of the pin stem to be received in the hook, said hook being spaced from the base a distance less than the diameter of the pin stem, said guard and hook being relatively resilient to spread apart as pin stem pressure is exerted on them and for said hook to be moved from said base, said joint and pin stem being so biased that the pin stem will swing in an arc on the hook side of the entrance to said hook so that when released from passing between said guard and hook and said hook and base, it will move toward said arm beneath the hook.

5. A pin stem, catch, and joint as in claim 4 wherein the joint and pin stem are also so arranged as to require the pin stem to be flexed to enter said catch, thereby causing the stem to move away from the base when released to press against the under side of the hook.

6. A catch for a pin stem comprising a base with an arm extending generally perpendicular thereto then laterally over the base and then toward the base to provide a retaining hook for the pin stem and a guard extending generally perpendicular to the base adjacent said hook with its surface toward the hook spaced from the hook a distance less than the diameter of the pin stem to be received in the hook, said guard and hook being relatively resilient to spread apart as pressure is exerted on them through the pin stem to permit the pin stem to enter between them and be positioned within said hook, said hook having its end portion curved into a closed loop and being positioned closer to the base than the diameter of the pin stem and being sufficiently resilient to be moved by the pin stem as moved about the closed loop within the hook to block the exit of the pin stem from the hook.

References Cited in the file of this patent

UNITED STATES PATENTS

| | | |
|---|---|---|
| 415,459 | Hickey | Nov. 19, 1889 |
| 797,463 | Singleton | Aug. 15, 1905 |
| 1,134,898 | Noxon | Apr. 6, 1915 |
| 1,148,292 | Davey | July 27, 1915 |
| 1,183,415 | West | May 16, 1916 |
| 1,406,708 | Williams | Feb. 14, 1922 |
| 1,485,933 | Kintzele | Mar. 4, 1924 |
| 1,814,290 | Cartier | July 14, 1931 |